(12) United States Patent
Bishop

(10) Patent No.: US 8,212,442 B1
(45) Date of Patent: Jul. 3, 2012

(54) TORQUE / ENERGY TRANSFER METHOD AND APPARATUS

(76) Inventor: Wayne Paul Bishop, Wilmington, DE (US)

(*) Notice: Subject to any disclaimer, the term of this patent is extended or adjusted under 35 U.S.C. 154(b) by 0 days.

(21) Appl. No.: 12/986,073

(22) Filed: Jan. 6, 2011

Related U.S. Application Data

(60) Provisional application No. 61/293,052, filed on Jan. 7, 2010.

(51) Int. Cl.
*H02K 7/02* (2006.01)
*H02K 51/00* (2006.01)
*B60K 6/00* (2007.10)

(52) U.S. Cl. ......... 310/74; 310/115; 180/165; 74/572.1; 74/572.21

(58) Field of Classification Search .................... 310/74, 310/96, 102 R, 103, 112–115; 476/4; 903/960; 74/572.1–572.2, 572.21; 290/49; 322/3, 322/4
See application file for complete search history.

(56) References Cited

U.S. PATENT DOCUMENTS

| | | | | | |
|---|---|---|---|---|---|
| 3,497,026 | A | * | 2/1970 | Calvert | 180/165 |
| 3,805,638 | A | * | 4/1974 | Herdzina | 74/572.1 |
| 3,858,674 | A | * | 1/1975 | Tabor | 180/165 |
| 4,625,823 | A | * | 12/1986 | Frank | 180/165 |
| 6,573,626 | B1 | * | 6/2003 | Gosebruch et al. | 310/74 |
| 6,740,002 | B1 | * | 5/2004 | Stridsberg | 477/14 |
| 6,935,987 | B1 | * | 8/2005 | Booth, Jr. | 476/4 |
| 7,294,938 | B2 | * | 11/2007 | Miyao | 290/45 |
| 2011/0061953 | A1 | * | 3/2011 | Gibson et al. | 180/65.6 |

* cited by examiner

*Primary Examiner* — Burton Mullins
(74) *Attorney, Agent, or Firm* — Jeffrey R. Ramberg

(57) ABSTRACT

The Harmonic Accumulation and Relative Transference of Kinetic Energy method does not transmit, but rather, transfers torque/energy from a power source to a driven system of higher rotational speed through the use of an oscillating flywheel and a potential energy storage device, for example, a torsion spring The power source adds energy to the oscillating flywheel by applying an impulse torque to the flywheel just as the flywheel begins to start rotating, and then transfers that energy to the driven system when the flywheel's speed (which may be its highest rotational speed) matches that of the driven system's rotational speed and direction. Thus, the energy is transferred when the flywheel and the driven system are at 0 rpm "relative" to each other. Accordingly, the impulse torques may be applied using principles of electric motors.

10 Claims, 4 Drawing Sheets

Sectional View A

Sectional View A

Sectional View B

TORQUE / ENERGY TRANSFER METHOD AND APPARATUS

CROSS-REFERENCE TO RELATED APPLICATIONS

This patent document claims the benefit of commonly owned U.S. Provisional Patent Application Ser. No. 61/293,052, filed on Jan. 7, 2010 in the name of Wayne Paul Bishop. The entire contents of this provisional patent application are expressly incorporated herein by reference.

STATEMENT REGARDING FEDERALLY SUPPORT RESEARCH

None.

FIELD OF THE INVENTION

The present invention relates to ways for transferring or transmitting rotational motion. Invention is a unique method of transferring available torque/energy directly to the driven system without regard to, and independent of, the driven system's rotational speed. The All Speed Transmission Motor (ASTM) is the all-electric preferred embodiment utilizing this method that Applicant calls the "harmonic accumulation and relative transference of kinetic energy" method.

BACKGROUND ART

All existing transmissions have their outputs directly connected to their inputs and therefore have an input to output "ratio". This "ratio" therefore dictates what percentage of the input torque will be available as output torque. If the output is to drive a system that is rotating at a high rpm (revolutions per minute) the input must either rotate at the same high rpm (ratio of 1 to 1) or, if that is not practical or possible (for example in the peddling of a bicycle), then a higher ratio (e.g., 1 to 2, 3, 4 etc.) must be used to achieve a higher rpm output from a lower rpm input.

In the first example (ratio of 1 to 1), the power source input must run at a high rpm which will use more energy (limiting achievable range of vehicles), generate more noise, run hotter and generally wear out faster.

In the second example, where a ratio of 1 to 2, 3, 4 etc. (gearing up) must be used to achieve an output rpm higher than that of the input, the output torque will therefore be decreased proportionally. The higher the ratio the lower the output torque. This loss of torque resulting from higher ratios (gearing up) as speed increases is the problem with present transmission technology and severely limits achievable maximum speed.

The present invention addresses and solves these problems.

SUMMARY OF THE INVENTION

In accordance with the present invention, available torque/energy is transferred directly from a power source to the driven system without regard to, and independent of, the driven system's rotational speed. The inventor refers to this method as the Harmonic Accumulation and Relative Transference of kinetic energy method. This method does not transmit, but rather, transfers torque/energy from a power source to a driven system of higher rotational speed through the use of an oscillating flywheel and a balance spring (e.g., potential energy storage device) The flywheel acts like a balance wheel in a watch: alternating energy states between all kinetic energy at the highest rotational speed to all potential energy when the flywheel is at 0 rpm (revolutions per minute), and all energy is contained in the energy storage device. The power source adds energy to the oscillating flywheel by applying an impulse torque to the flywheel just as the flywheel begins to start rotating, and then transfers that energy to the driven system when the flywheel's speed (which may be its highest rotational speed) matches that of the driven system's rotational speed and direction. Thus, the energy is transferred when the flywheel and the driven system are at 0 rpm "relative" to each other. Using the motor coils on the flywheel and the motor coils on the driven system, an impulse torque is generated that propels the driven system faster and the flywheel to slowdown. This continuous adding and transferring of energy to and from the flywheel delivers torque to a system of higher rotational speed while still inputting torque from 0 rpm and transferring torque from a "relative" 0 rpm. The ASTM (All Speed Transmission Motor) is the all-electric embodiment utilizing this method.

DEFINITIONS OF TERMS

Figure 1:
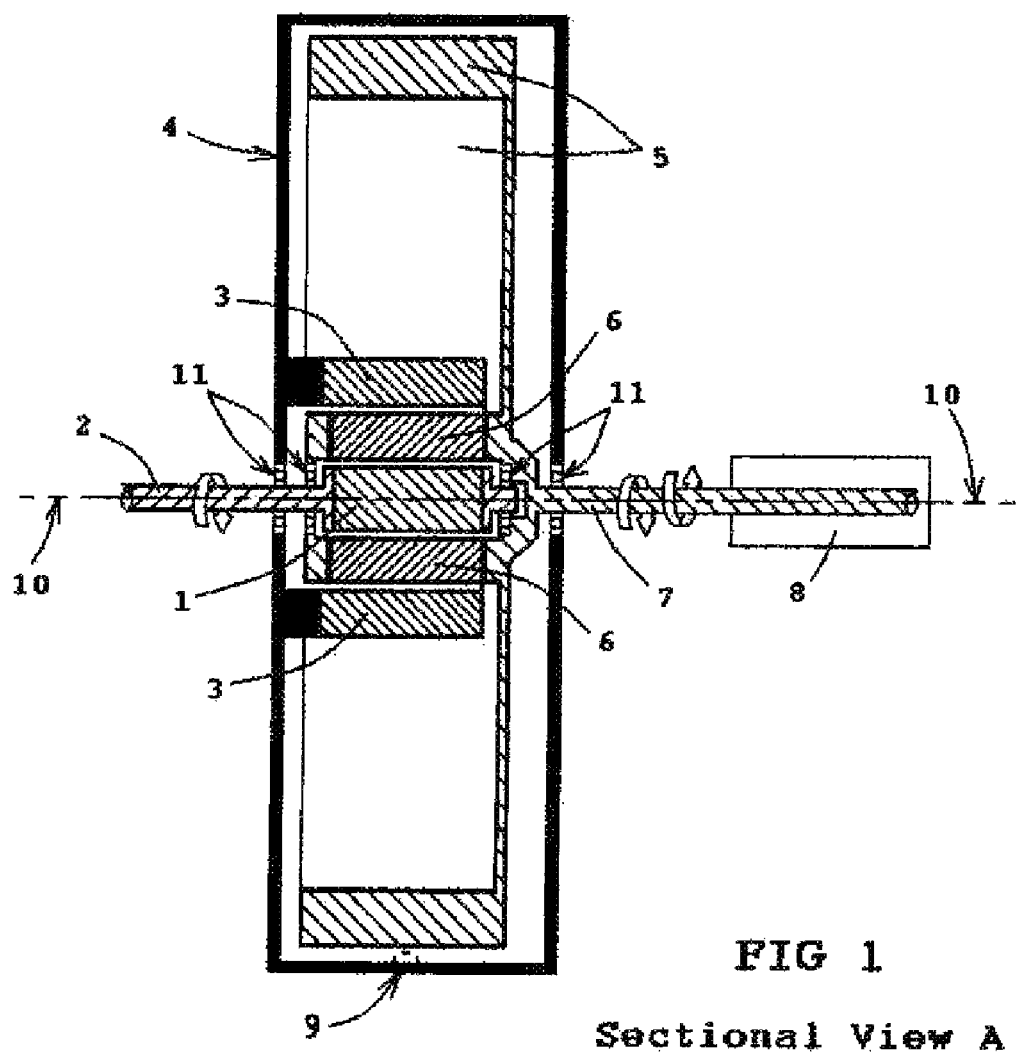
FIG. 1 is a sectional view A from FIG. 4 showing all components of the invention.

Armature—Normally the moving (rotating) coil component of an electric motor.

Stator—The coil component of an electric motor that the armature electro-magnetically pushes or pulls on to develop torque. Note that the torque is felt equal and opposite on bath armature and stator but because the stator is normally fixed the armature will usually be the component that turns and delivers the torque/energy to the driven system. However, if the stator is also free to rotate, then the stator and armature will attempt to rotate in opposite directions with equal torque applied to each.

DETAILED DESCRIPTION OF THE INVENTION

The method of the present invention, called "harmonic accumulation and relative transference of kinetic energy" makes it possible to apply/transfer (using an oscillating flywheel mass) a given impulse torque (constant torque over a given amount of time) DIRECTLY to a second rotational frame of reference of much higher rotational speed (rpm—revolutions per minute) as if the second rotational frame of reference were "standing still". This unique method does not transmit, but rather, TRANSFERS the available impulse torque DIRECTLY to the system being driven (e.g., wheels of an automobile) and involves NO ratios, not even directly driven, as is the case with ALL currently existing transmissions or electric motors.

The present Harmonic Accumulation and Relative Transference of kinetic energy method does not transmit, but rather, transfers torque/energy from a power source to a driven system of higher rotational speed through the use of an oscillating flywheel and a balance spring (e.g., potential energy storage device) The flywheel acts like a balance wheel in a watch: alternating energy states between all kinetic energy at the highest rotational speed to all potential energy when the flywheel is at 0 rpm (revolutions per minute), and all energy is contained in the energy storage device. The power source adds energy to the oscillating flywheel by applying an impulse torque to the flywheel just as the flywheel begins to start rotating, and then transfers that energy to the driven system when the flywheel's speed (which may be its highest rotational speed) matches that of the driven system's rotational speed and direction. Thus, the energy is transferred when the flywheel and the driven system are at 0 rpm "relative" to each other. Using the motor coils on the flywheel and the motor coils on the driven system, an impulse torque is generated that propels the driven system faster and the flywheel to slowdown. This continuous adding and transferring of energy to and from the flywheel delivers torque to a system of higher rotational speed while still inputting torque from 0 rpm and transferring torque from a "relative" 0 rpm. It is anticipated that the timing, duration and amplitude of all electrically induced (e.g., motored) torque impulses for the successful transfer of torque/energy using this method are computer controlled in conjunction with speed and position sensors.

The invention will be described with reference to FIGS. 1-4, which figures will first be described.

Figure 4:
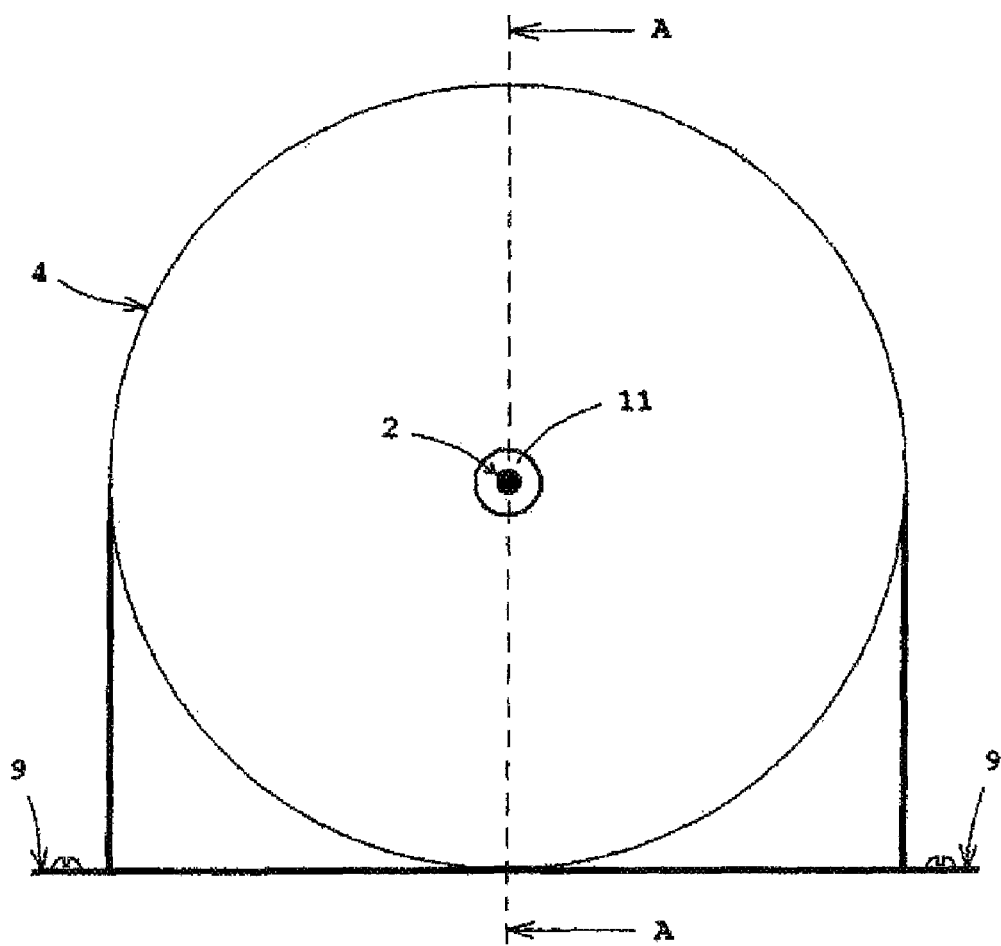
FIG. 4 is an external side view of the ASTM assembly.

FIG. 1 is the sectional view A from FIG. 4 showing all components of the invention, plus rotational directions of movement for shafts 2 and 7. The energy storage system is a highly efficient method of storing and releasing kinetic energy, and only shows its location relative to the other components, and that it is connected to shaft 7. No detail as to the type or method of storing and releasing energy from and back to the flywheel is detailed; however a torsion spring system is the likely choice.

Figure 2:
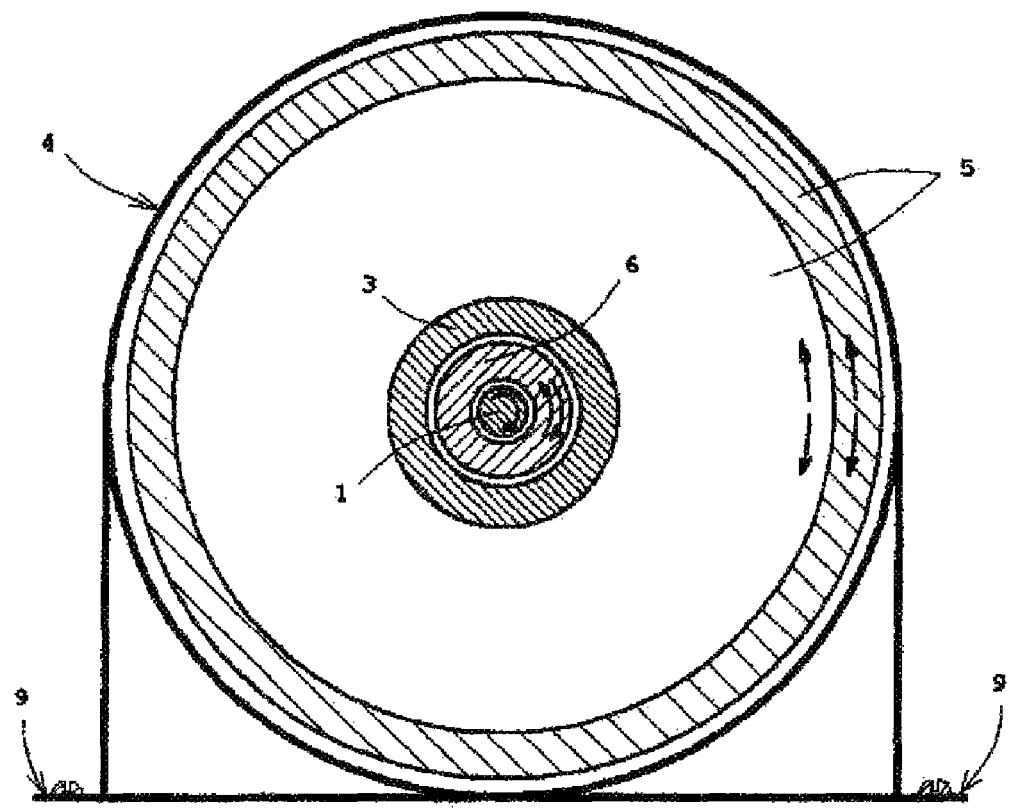
FIG. 2 is a sectional view B from FIG. 3 showing relative positions of coils, flywheel and Frame.
Figure 3:
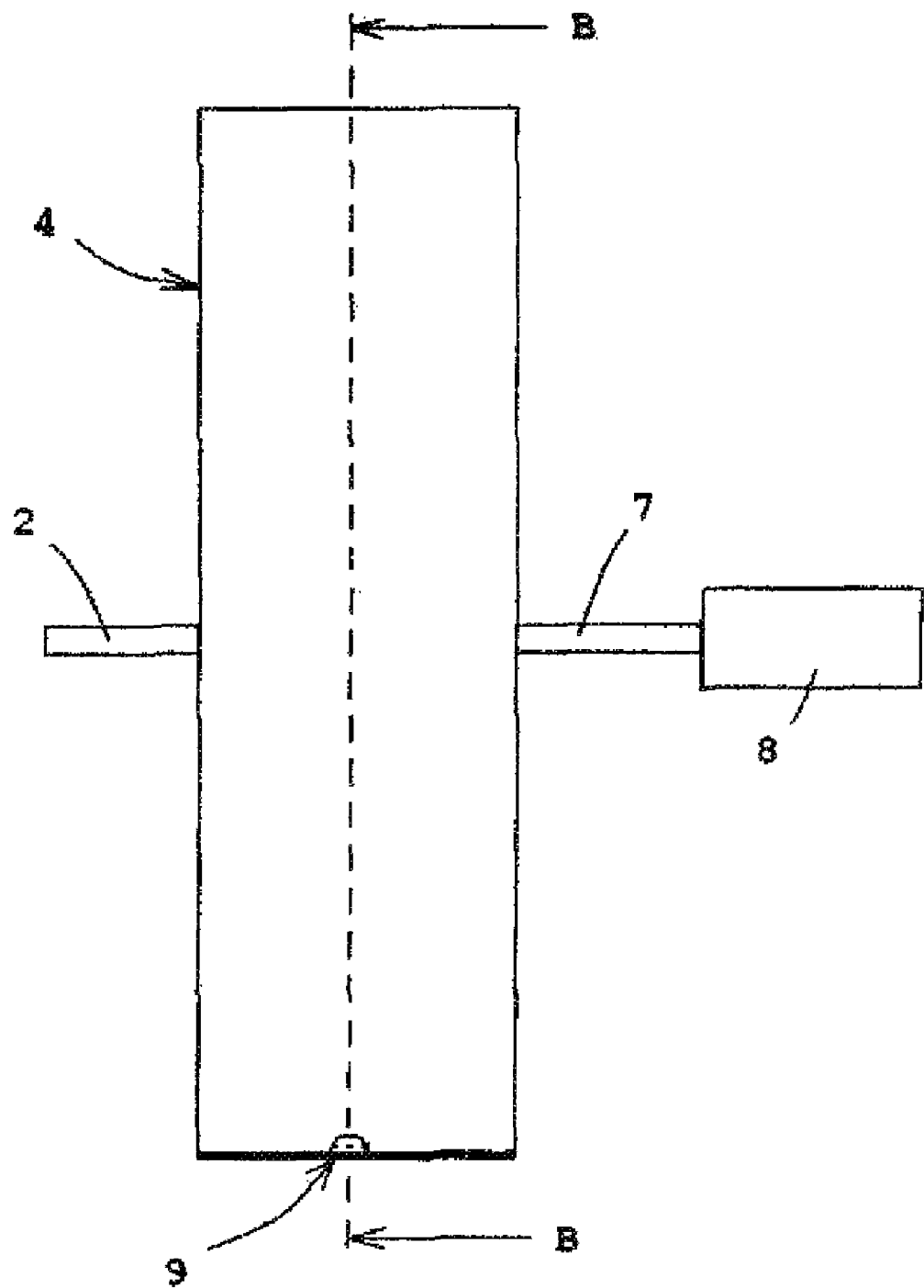
FIG. 3 is an external front view of the entire ASTM assembly.

FIG. 2 is the sectional view B from FIG. 3 showing the positional relationships of coils 1,6, and 3 to each other, and the direction of rotation of coils 1 and 6 and flywheel 5. Note that coil 6 is affixed to flywheel 5, and when they oscillate back and forth (clockwise then counter clock-wise, they do so as one unit. Also shown is the body assembly 4 that houses and supports all the components except the energy storing system 8. The body assembly 4 is held stationary at the body assembly mounts 9.

FIG. 3 is an external front view of the entire ASTM assembly showing output shaft 2, flywheel input/output shaft 7, and a housing body assembly 4. Energy storage system 8 is a highly efficient method of storing and releasing kinetic energy and only shows its location relative to the other components, and that it is connected to shaft 7. No detail as to the type or method of storing and releasing energy from and back to the flywheel is detailed; however a torsion spring system is the likely choice. Sectional View B is also designated.

FIG. 4 is an external side view of the ASTM assembly showing output shaft 2, bearing 11, body assembly 4, and body assembly mounts 9. Sectional View A is also designated.

Referring to FIGS. 1-4, the product features the following components:

Output Armature Coil 1—Motor armature coil that develops final output torque.

Output shaft 2—Shaft that is directly connected to the driven system (e.g., wheels) at one end and to the Output Armature Coil 1 at its other end.

Harmonic Impulse Stator Coil 3—Fixed motor stator coil affixed to the Body Assembly 4.

Body Assembly 4—Fixed frame that houses and supports, via bearings, (Ball bearing 11) most of the ASTMs components and on which the Harmonic Impulse Stator Coil 3 is also affixed.

Flywheel Assembly 5—A circular weighted flywheel of hollow drum design that is open on one side so as to allow for the intrusion of the Harmonic Impulse Stator Coil 3. Flywheel Assembly 5 is to be used for its rotational momentum and inertia properties.

Flywheel Dual Function Coil 6—Motor coil that is affixed to the Flywheel Assembly 5 and can be motored to generate torque in both rotational directions (clockwise or counterclockwise).

Flywheel Input/Output Shaft 7—Shaft that is connected at one end to the Flywheel Assembly 5 and to the Energy Storage System 8 at the other.

Energy Storage System 8—Highly efficient potential energy storing system in which to temporarily store kinetic energy from and release back Body Assembly Mount 9—Mounts that are affixed to Body Assembly 4 and hold Body Assembly 4 secure and stationary.

Central axis 10—Central axis around which Output Armature Coil 1, Output shaft 2, Flywheel Assembly 5, Dual Function Coil 6 and Flywheel Input/Output Shaft 7 rotate, Central axis 10 is also the same central axis for Harmonic Impulse Stator Coil 3 which remains stationary.

Ball Bearing 11—Ball bearings used for support and/or allowance of components to freely rotate.

Referring now to FIG. 1 specifically, the ASTM as shown here is what could be described as a single phase akin to showing a one (1) cylinder operation of a four (4) cycle engine. This embodiment performs all the functions necessary to achieve the desired outcome from Input to output however due to using impulse torques throughout its function the output is an impulse torque and not a continuous torque. Therefore in order to achieve a smoother, more continuous torque output the final design would need to have multiple phases with overlapping outputs or possibly some type of energy buffer system that would take the pulsing outputs and temporarily store them and release them in a smooth and continuous output. Also the Body Assembly 4 could be sealed and all internal elements could operate in a vacuum for more efficiency.

Referring still to FIG. 1, Output Armature Coil 1 is affixed to Output Shaft 2 which connects to the driven system (e.g., wheels) and rotates directly with their movement. The Output Armature Coil 1 only rotates in one (1) direction while energized to propel a vehicle in a forward movement. (Note: only rotates in opposite direction during reverse motoring to achieve a reverse movement of said vehicle and then only if engineered to achieve reverse in that manner.) Output Armature Coil 1 in conjunction with flywheel Dual Function Coil 6 act together as a motor with the Output Armature Coil 1 being the armature and Dual Function Coil 6 being the stator however the stator (Dual Function Coil 6) may also be rotating. Output Armature Coil 1 develops final output torque by motoring (Impulse torque) off of the Dual Function Coil 6. This motoring (impulse torque) is not preformed until Dual Function Coil 6 reaches the same rotational speed (rpm) and is rotating in the same rotational direction as Output Armature Coil 1. If Dual Function Coil 6's rotational speed (rpm) is less than Output Armature Coil 1's rotational speed (rpm) then Dual Function Coil 6 will be accelerated by harmonic torque impulses from Harmonic Impulse Stator Coil 3 at the times when Dual Function Coil 6 is at 0 rpm relative to Harmonic Impulse Stator Coil 3 until Dual Function Coil 6's rotational speed (rpm) equals that of Output Armature Coil 1's rotational speed (rpm). At that time, when rotating in the same direction, the Output Armature Coil I and Dual Function Coil 6 (e.g., flywheel) have a 0 rpm rotational speed relative to each other and, when motored (impulse torque), there is an action-reaction impulse torque felt equally on both the Output Armature Coil 1 and Dual Function Coil 6 (e.g. flywheel) but in opposite directions. (For every action there is an equal and opposite reaction) This impulse torque attempts to increase Armature Coil 1's rotational speed (rpm) which transmits through Output Shaft 2 to apply final output torque to the driven system (e.g., wheels) and in the same rotational direction as the driven system (e.g., wheels). The torque on the Dual Function Coil 6 (e.g., Flywheel) is in the opposite rotational direction on Output Armature Coil 1 and causes the Flywheel Assembly 5 to decrease its rotational speed (rpm) which therefore decreases its kinetic energy. The decease in Flywheel Assembly 5's kinetic energy is equal to the energy applied to the final output from Armature Coil 1. This is how the kinetic energy from Flywheel Assembly 5 is transferred to the driven system.

The final output torque and rotational speed that is developed by Output Armature Coil 1 is delivered to the driven system (e.g., wheels) over Output Shaft 2 to which it is affixed.

Harmonic Impulse Stator Coil 3 is a motor stator coil that is affixed to Body Assembly 4 and remains stationary. Harmonic Impulse Stator Coil 3 in conjunction with Dual Function Coil 6 act together as a motor with the Impulse Stator Coil 3 being the stator and Dual Function Coil 6 being the armature. This motor is used to harmonically impulse the Flywheel Assembly 5 in order to accumulate kinetic energy in the Flywheel Assembly 5. Flywheel Assembly 5 oscillates rotationally back and forth, (clock-wise then counter-clockwise) like a balance wheel in a watch, around a central axis and is at 0 rotational speed (0 rpm) at each end of its oscillation when all of its rotational kinetic energy has been transferred (stored) into the Energy Storage System 8 as potential energy. It is at those times of 0 rotational speed (0 rpm) that the Dual Function Coil 6 motors (impulse torques) off of the Harmonic Impulse Stator Coil 3. This constant harmonic pulsing (impulses) is what adds kinetic energy to the Flywheel Assembly 5. The Flywheel Assembly 5's kinetic energy will then be used for its momentum/inertial properties.

Body Assembly 4 is a fixed frame that houses and supports, via bearings (Ball Bearing 11) on Output Shaft 2 and Flywheel Input/Output Shaft 7, the Output Armature Coil 1, Dual Function Coil 6 and Flywheel Assembly 5. The Harmonic Impulse Stator Coil 3 does not move for it is affixed to the Body Assembly 4 which is held from any movement by Body Assembly Mounting.

Flywheel Assembly 5, to which Dual Function Coil 6 and Flywheel Input/Output Shaft 7 are affixed, is a flywheel mass whose main purpose is to supply an inertial mass that can be electromagnetically pulled or pushed against (torque against) in order to create an equal force (torque) in the opposite direction. (Recall one of Newton's Laws of Motion, "For every action there is an equal and opposite reaction.") The Flywheel Assembly 5 is supported by bearings (Ball Bearing 11) and is able to rotate back and forth (oscillate) around a central axis (Central axis 10) in either rotational direction (Clock-wise or counter-clock-wise). Dual Function Coil 6 in conjunction with Harmonic Impulse Stator Coil 3 act as a motor whose sole function is to supply a harmonic Impulse torque, in both rotational directions, to Flywheel Assembly 5 in order to maintain or increase the kinetic energy in Flywheel Assembly S and to obtain a minimum rotational speed (rpm) to Dual Function Coil 6 that is equal to or greater than that of Armature Coil 1. Basic oscillation (similar to the function of a balance wheel in a watch) of Flywheel Assembly 5 is achieved by continually storing its kinetic energy into and receiving potential energy back from the Energy Storage System 8 (similar to the function of a balance spring in a watch). The kinetic energy from Flywheel Assembly 5 is transmitted to and from Energy Storage System 8 through Flywheel Input/Output Shaft 7. The Flywheel Assembly 5's kinetic energy will then be used for its momentum/inertial properties.

Flywheel Dual Function Coil 6 serves two functions. In its first function, Flywheel Dual Function Coil 6 acts as an armature in conjunction with Harmonic Impulse Stator Coil 3 to form the motor that supplies the harmonic impulses to Flywheel Dual Function Coil 6 (e.g., flywheel) In order to increase or maintain Flywheel Assembly 5's oscillatory rotational speed (rpm). Flywheel Dual Function coil 6 is harmonically pulsed (impulse torque) by Harmonic Impulse Stator Coil 3 to obtain a rotational speed (rpm) equal to, and rotating in the same rotational direction as, that of Armature Coil 1 before Flywheel Dual Function Coil 6's second function can be preformed.

The second function of Flywheel Dual Function Coil 6 is to act as a freely rotating stator that oscillates with Flywheel Assembly S around Armature Coil 1. Together they form a motor that when motored (impulse torque) develops an impulse torque on Armature Coil 1 and Flywheel Dual Function coil 6 (e.g., flywheel) in equal and opposite rotational directions.

As stated previously, this motoring (impulse torque) is not preformed until Dual Function Coil 6 reaches the same rotational speed (rpm) and is rotating in the same rotational direction as Output Armature Coil 1. At that time, the Output Armature Coil 1 and Dual Function Coil 6 (e.g., flywheel) have a 0 rpm rotational speed relative to each other and, when motored (impulse torque), develops an impulse torque on Armature Coil 1 and Flywheel Dual Function Coil 6 (e.g., flywheel) in equal and opposite rotational directions. (Recall one of Newton's Laws of Motion, "For every action there is an equal and opposite reaction".) The impulse torque on the Dual Function Coil 6 (e.g., Flywheel) causes the Flywheel Assembly 5 to decrease in rotational speed (rpm) and therefore decrease in kinetic energy. The decease in Flywheel Assembly 5's kinetic energy is equal to the energy applied to the final output from Armature Coil 1.

The impulse torque, equal and opposite to Dual Function Coil 6, attempts to increase Armature Coil's rotational speed (rpm) which transmits through Output Shaft 2 to apply final output torque to the driven system (e.g., wheels) and in the same rotational direction as the driven system (e.g., wheels). This is how the kinetic energy from Flywheel Assembly 5 is transferred to the driven system.

Flywheel Input/Output Shaft 7 is the shaft by which energy is transferred back and forth from Flywheel Assembly 5 (kinetic energy) to Energy Storage System 8 (potential energy).

Energy Storage System 8 is used to temporarily store the kinetic energy from Flywheel Assembly 5, as potential energy, and release it back to Flywheel Assembly 5 as kinetic energy at a timing that is determined by the computer software. This energy transferring between Flywheel Assembly 5 and Energy Storage System 8 is transferred over flywheel Input/Output shaft 7.

Body Assembly Mount 9 is affixed to Body Assembly 4 and keeps Body Assembly 4 from moving.

Central axis 10 shows the central axis around which Output Armature Coil 1, Output shaft 2, Flywheel Assembly 5, Dual Function Coil 6 and Flywheel Input/Output Shaft 7 rotate. Central axis 10 is also the same central axis for Harmonic Impulse Stator Coil 3 which remains stationary.

Ball Bearing 11 are bearings that give support between components as shown while also allowing for rotational movement with minimal frictional resistance.

The desired function is to be able to apply a given impulse torque (a given torque over a given amount of time), directly to the system to be driven, e.g., wheels of a vehicle, without the driven systems rotational speed (rpm) being a factor or affecting the application of said given impulse torque in any way. The desired function can be achieved through the~method~that I call "harmonic accumulation and relative transference of kinetic energy'.

The harmonic accumulation of kinetic energy will now be discussed, again with reference to FIG. 1.

Basic oscillation (similar to the function of a balance wheel in a watch) of Flywheel Assembly 5 is achieved by continually storing its kinetic energy into and receiving potential energy back from the Energy Storage System 8. (Similar to the function of a balance spring in a watch). Kinetic energy is added to the oscillating Flywheel Assembly 5 when Flywheel Assembly 5 is at 0 rpm and just starting to rotationally accelerate in the opposite rotational direction. It is at this time that all of Flywheel Assembly 5's kinetic energy is stored in Energy Storage System 8 as potential energy. Constant pulsing (impulse torque) at these times is achieved by motoring Dual Function Coil 6 off of Harmonic Impulse Stator Coil 3 in the desired rotational direction needed, which is to say, in the same rotational direction that Energy Storage System 8 is releasing its potential energy (applying torque) back to Flywheel Assembly 5 at that time. Harmonic Impulse Stator Coil 3 does not and can not move because it is affixed to Body Assembly 4 which is held stationary by Body Assembly Mount 9 screws or bolts. Constant harmonic pulsing (impulse torque) in this manner continuously adds (accumulates) kinetic energy and increases rotational speed (rpm) of Flywheel Assembly 5 without the need to increase the input torque or the input rotational speed (rpm) even as Flywheel Assembly 5's rotational speed increases. Flywheel Assembly 5 only oscillates and 5 harmonically pulsed in this manner to achieve and maintain a rotational speed (rpm) equal to, or greater than, that of Armature Coil 1, If Energy Storage System S potential energy is determined by computer software to be enough, If needed, to accelerate Flywheel Assembly 5 to a rotational speed (rpm) equal to or greater than that of Armature Coil its then Flywheel Assembly 5 will be held stationary with all the energy as potential energy in Energy Storage System 8. Depending on how fast energy is being taken from Flywheel Assembly 5 to maintain or accelerate the vehicle (see—inertial transfer of kinetic energy) will determine how much the harmonic Impulse torque needs to be increased by motoring (impulse torque) of Harmonic Impulse Stator Coil 3 and Dual Function Coil 6 in order to maintain Flywheel Assembly 5's rotational speed (rpm) equal to or greater than Armature Coil 1.

It is this unique method of harmonic pulsing using alternating energy states that makes it possible to efficiently accumulate, with only low torque input impulses, a high rpm rotational mass with high kinetic energy. This can not be achieved with the same amount of available energy applied to a rotating mass that only rotates in one direction. Efficient accumulation of high kinetic energy and high rotational speeds (rpm) in a flywheel using low Impulse torque inputs is a unique function of this invention and the first stage in achieving the total desired function of the invention.

Next, the relative transference of kinetic energy will be discussed, still with reference to FIG. 1.

Now that we have achieved a mass (Flywheel Assembly 5) rotating at the same rotational speed and rotational direction as Output Armature Coil 1 (wheels), and therefore Output Armature Coil 1 and Dual Function Coil 6 are at 0 rpm relative to each other, we can now develop an output torque on Output Armature Coil 1 by motoring (impulse torque) Output Armature Coil 1 (e.g., wheels) against Dual Function Coil 6 (e.g., Flywheel Assembly 5). The inertial resistance to rotation from Dual Function Coil 6 (e.g., Flywheel Assembly 5) applies an equal but opposite impulse torque to Output Armature Coil 1 (e.g., wheels). It is the constant impulse torque (motoring) being applied at the times when Output Armature Coil 1 and Dual Function Coil 6 are at the same rotational speed and direction that develops the constant impulse torque output on Armature Coil 1. This is the final output torque, developed on Output Armature Coil 1 that is transmitted over Output Shaft 2 to the driven system (wheels).

Notice that there would be the same rotational impulse torque (a given torque over a given amount of time) applied to the wheels (from Output Armature Coil 1) no matter how fast the wheels were turning because the wheels would always be at 0 rpm relative to the flywheel (Flywheel Assembly 5). This is the desired function of the invention.

By making an electric motor whose normally fixed stator (Dual Function Coil 6) could also rotate freely around its armature (Output Armature Coil 1) and then affixing to that stator (Dual Function Coil 6) a flywheel (Flywheel Assembly 5) that is also on a central axis (Central axis 10) with the stator (Dual Function Coil 6) and rotates with the stator (Dual Function Coil 6). Then affixed a shaft (Flywheel Input/Output Shaft 7) to the flywheel (Flywheel Assembly 5) which would be centered along the same axis (Central axis 10) as the armature shaft (Output Shaft 2) but extending in the opposite direction and from the opposite side of the motor. Now build a frame (Body Assembly 4) with bearings (Ball Bearing 11) that could support the motor/flywheel components by the flywheel shaft (Flywheel Input/Output Shaft 7) on one side and the armature shaft (Output Shaft 2) on the opposite side and would also allow the motor/flywheel components to be free to rotate. Affix (attach) another (third) motor coil (Harmonic Impulse Stator Call 3) to this stationary frame (Body Assembly 4) such that this motor coil (Harmonic Impulse Stator Coil 3) will surround the outside of the stator coil (Dual Function Coil 6) that is affixed to the flywheel (Flywheel Assembly 5). Affix (attach) the other end of the flywheel shaft (Flywheel Input/Output Shaft 7) to some type of energy storing system (Energy Storage system 8) that could store as potential energy, and release back the rotational kinetic energy from the rotating flywheel. The energy storage system (Energy Storage System 8) must be able to store said rotational kinetic energy from both rotating directions as in oscillating (e.g. clockwise and counterclockwise). The energy storage system (Energy Storage System 8) must also hove the ability to lock up whenever the flywheel is at 0 rpm and not release the stored energy back to the flywheel until requested by the computer software. All motor coils must be engineered to be able to motor, one against the other, in both rotational directions and in quick, short, and high torque impulses as needed. All timing, duration and amplitude of impulse torque and energy transfers as described in the present description of the invention are controlled by computer software in conjunction with speed and position sensors.

Alternate Embodiments/Configurations of the Invention

Referring again to FIG. 1, the Harmonic Impulse Stator Coil 3 which is used in this embodiment in conjunction with Dual Function Coil 6 to apply harmonic Impulse torque to Flywheel Assembly 5 in order to increase Flywheel Assembly 5's rotational speed (rpm) could be removed and the harmonic impulses (impulse torque) could be applied externally to Flywheel Input/Output Shaft 7 or that same energy could be added to Energy Storage System 8 itself, which would effectively increase Flywheel Assembly 5's rotational speed due to the increase of Energy Storage System 8's potential energy, e.g., maximum torque available.

Another configuration that would utilize this method and still achieve the same function would involve using Flywheel Assembly 5's momentum with or without motoring instead of using Flywheel Assembly 5's inertia with motoring. Flywheel Assembly 5 would still use harmonic impulses by any of the means previously described to increase its rotational speed (rpm) and therefore its kinetic energy. However, using Flywheel Assembly 5's inertia for Output Armature Coil I to motor against at the time when both Output Armature Coil 1 and Flywheel Assembly 5's rotational speeds (rpm)s are equal (0 rpm relative to each other) would not be used. Instead, Flywheel Assembly 5's rotational speed would constantly be increased (by harmonic impulses) to be something greater then the rotational speed of Output Armature Coil 1 at which time Flywheel Assembly 5's momentum alone would be applied to Output Armature Coil 1 by some means of smoothly engaging Flywheel Assembly 5 with Output Armature Coil 1, thereby applying (developing) final out torque on Output Armature Coil 1. Or, Flywheel Assembly 5's momentum would be applied in conjunction with motoring (impulse torque) of Output Armature Coil 1 against Flywheel Assembly 5 in order to apply (develop) a final output torque on Output Armature Coil 1.

INDUSTRIAL APPLICABILITY

In view of the foregoing, one skilled in the art will be able to appreciate that, by using this method of torque/energy transfer, one will be able to apply a substantial portion of a given torque at a given rpm (revolutions per minute) to a system rotating at a much higher rpm without the need to (1) speed up to match the higher rpm system's rotational speed or (2) ratio up (gear up) to match the higher rpm system's rotational speed. The skilled artisan will also be able to use this technology in order to develop an all electric propulsion system that would run slower, quieter, last longer, cost less and use less energy, thereby increasing the achievable range of an all electric vehicle. Still further, the skilled person also will be able to use the electric or mechanical version of this technology to greatly increase the efficiency of all human powered vehicles, resulting in achieving much higher maximum speeds than presently achievable for bicycles, and the development of high speed human powered automobiles.

Given the nature of this invention, it would probably be used in the automotive industry in the development of their power trains and propulsion systems for automobiles and trucks. For example, the auto manufactures would use the ASTM in place of the standard ICE (Internal Combustion Engine) and automatic transmission or standard transmission combination to change them into all-electric vehicles. Since the cost to manufacture an ASTM would be far less then the present engine/transmission combinations, and the ASTM is far more efficient, an All-Electric vehicle would now be feasible AND affordable. Everyone would then buy them and our Auto Industry would not only be saved but would grow by leaps and bounds and millions would go back to work. The economy crisis, not to mention the ecology and our dependency on foreign oil, would be solved. The ASTM method (transmission only) could also be used by auto manufacturers in place of their present automatic transmission or standard transmission order to achieve far superior fuel economy in their ICE (Internal Combustion Engine) vehicles.

The artisan of ordinary skill will appreciate that various modifications may be made to the invention herein described without departing from the scope or spirit of the invention as defined in the appended claims.

What is claimed is:

1. A method for transferring energy from an energy storage device to an output shaft, comprising:
    (a) providing a driven system comprising an output shaft;
    (b) providing a flywheel having an input shaft that is coaxial with said output shaft, said flywheel being arranged to oscillate on said input shaft;
    (c) providing a body assembly comprising a means for supporting said input shaft and said output shaft;
    (d) providing an energy storage device that is able to exchange energy back-and-forth with said flywheel;
    (e) adding a quantity of mechanical energy to said flywheel, said quantity being in the form of a first torque impulse that manifests itself as an absolute value increase in rotational speed of said flywheel about said input shaft, said adding being performed when said flywheel is at or close to a state of rest relative to said support means;
    (f) transferring said kinetic energy back-and-forth between said flywheel and said energy storage device in an oscillating manner;
    (g) continuing steps (e) and (f) until a rotational velocity of said flywheel matches that of said output shaft in quantity and direction; and
    (h) when said rotational velocity matches, transferring a second quantity of torque impulse from said flywheel to said output shaft, thereby increasing the rotational velocity of said output shaft and decreasing the rotational velocity of said flywheel.

2. The method of claim 1, wherein said second quantity of torque is created electromagnetically.

3. The method of claim 1, wherein said second quantity of torque is created by establishing magnetic fields that repel one another.

4. The method of claim 3, wherein said magnetic fields are created by providing a coil to said flywheel and an armature coil to said output shaft, arranged as they would be in an electric motor, and moving an electric current through said coils.

5. The method of claim 1, wherein said first quantity of torque is created electromagnetically.

6. The method of claim 1, further comprising providing a stationary stator coil attached to said body assembly and having an axis that is coaxial with said shafts, and wherein said first quantity of torque impulse is supplied to said flywheel by motoring said stator and coil of said flywheel.

7. An apparatus for transferring kinetic energy from a source of such energy to an output shaft, comprising:
    (a) a driven system comprising an output shaft;
    (b) a flywheel having an input shaft that is coaxial with said output shaft, said flywheel being arranged to oscillate on said input shaft;
    (c) a body assembly comprising a means for supporting said shafts;
    (d) an energy storage device that is able to exchange energy back-and-forth with said flywheel;
    (e) means for adding a quantity of mechanical energy to said flywheel, said quantity being in the form of a first torque impulse that manifests itself as an absolute value increase in rotational speed of said flywheel about said input shaft, said adding being performed when said flywheel is at or close to a state of rest relative to said support means;
(f) means for exchanging energy back-and-forth between said flywheel and said energy storage device; and
(g) means for transferring a second quantity of torque impulse from said flywheel to said output shaft when a rotational velocity of said flywheel matches that of said output shaft in quantity and direction.

8. The apparatus of claim 7, further comprising a coil attached to said flywheel and an armature coil attached to said output shaft, each arranged relative to each other as to generate a torque about said shafts when said coils are electrically energized.

9. The apparatus of claim 7, further comprising providing a stationary stator coil attached to said body assembly and having an axis that is coaxial with said shafts.

10. The apparatus of claim 7, wherein said energy storage device comprises a torsion spring.

* * * * *